United States Patent
Lin

(10) Patent No.: US 12,253,784 B2
(45) Date of Patent: *Mar. 18, 2025

(54) ELECTRO-OPTIC DISPLAYS AND DRIVING METHODS

(71) Applicant: E INK CORPORATION, Billerica, MA (US)

(72) Inventor: Craig Lin, Fremont, CA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,443

(22) Filed: Sep. 12, 2023

(65) Prior Publication Data

US 2023/0418127 A1    Dec. 28, 2023

Related U.S. Application Data

(63) Continuation of application No. 16/512,726, filed on Jul. 16, 2019, now Pat. No. 11,789,330.

(60) Provisional application No. 62/699,117, filed on Jul. 17, 2018.

(51) Int. Cl.
    G02F 1/167    (2019.01)
    G09G 3/20     (2006.01)
    G09G 3/34     (2006.01)

(52) U.S. Cl.
    CPC .......... *G02F 1/167* (2013.01); *G09G 3/2074* (2013.01); *G09G 3/344* (2013.01); *G09G 2300/08* (2013.01); *G09G 2310/02* (2013.01); *G09G 2310/06* (2013.01); *G09G 2320/0204* (2013.01)

(58) Field of Classification Search
    CPC ...... G02F 1/167; G09G 3/2074; G09G 3/344; G09G 2300/08; G09G 2310/02; G09G 2310/06; G09G 2320/0204
    See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson |
| 6,054,071 A | 4/2000 | Mikkelsen, Jr. |
| 6,055,091 A | 4/2000 | Sheridon |
| 6,097,531 A | 8/2000 | Sheridon |

(Continued)

FOREIGN PATENT DOCUMENTS

KR    20100102970 A    9/2010

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

(Continued)

*Primary Examiner* — Benjamin C Lee
*Assistant Examiner* — Nathan P Brittingham
(74) *Attorney, Agent, or Firm* — Jason P. Colangelo

(57) ABSTRACT

A driving method for driving a display comprising an electrophoretic material having at least one type of colored pigment particle, the method includes applying at least one pulse pair to reset the at least one type of colored pigment particle, applying a separation pulse, and applying a second pulse pair to reset the at least one type of colored pigment particle.

18 Claims, 5 Drawing Sheets

(56) References Cited

U.S. PATENT DOCUMENTS

| | | |
|---|---|---|
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,930,818 B1 | 8/2005 | Liang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,786,974 B2 | 8/2010 | Zhou et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,593,396 B2 | 11/2013 | Amundson et al. |
| 8,605,032 B2 | 12/2013 | Liu et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,810,525 B2 | 8/2014 | Sprague |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,269,311 B2 | 2/2016 | Amundson |
| 9,299,294 B2 | 3/2016 | Lin et al. |
| 9,360,733 B2 | 6/2016 | Wang et al. |
| 9,373,289 B2 | 6/2016 | Sprague et al. |
| 9,390,066 B2 | 7/2016 | Smith |
| 9,390,661 B2 | 7/2016 | Chiu et al. |
| 9,412,314 B2 | 8/2016 | Amundson et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,640,119 B2 | 5/2017 | Lin et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 9,921,451 B2 | 3/2018 | Telfer et al. |
| 9,966,018 B2 | 5/2018 | Gates et al. |
| 10,032,419 B2 | 7/2018 | Lin et al. |
| 10,229,641 B2 | 3/2019 | Yang et al. |
| 10,319,313 B2 | 6/2019 | Harris et al. |
| 10,339,876 B2 | 7/2019 | Lin et al. |
| 10,353,266 B2 | 7/2019 | Bouchard et al. |

(56) References Cited

U.S. PATENT DOCUMENTS

| | | |
|---|---|---|
| 10,380,931 B2 | 8/2019 | Lin et al. |
| 10,593,272 B2 | 3/2020 | Telfer et al. |
| 10,672,350 B2 | 6/2020 | Amundson et al. |
| 10,803,813 B2 | 10/2020 | Crounse et al. |
| 11,049,463 B2 | 6/2021 | Lin et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2006/0244714 A1 | 11/2006 | Zhou et al. |
| 2007/0018944 A1 | 1/2007 | Johnson et al. |
| 2007/0052667 A1 | 3/2007 | Zhou et al. |
| 2007/0091117 A1 | 4/2007 | Zhou et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0128267 A1 | 6/2011 | Hsu |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0262255 A1 | 9/2015 | Khajehnouri et al. |
| 2016/0140910 A1 | 5/2016 | Amundson |
| 2016/0180777 A1 | 6/2016 | Lin et al. |
| 2016/0349592 A1 | 12/2016 | Goulding et al. |
| 2017/0025072 A1* | 1/2017 | Lin .................. G09G 3/2003 |

OTHER PUBLICATIONS

Wood, D., "An Electrochromic Renaissance?" Information Display, 18(3), 24 (Mar. 2002) Mar. 1, 2002.

Bach, Udo et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). 2001.

Yamaguchi, Y. et al., "Toner display using insulative particles charged triboelectrically", Asia Display/IDW '01, pp. 1729-1730, Paper AMD4-4 (2001). 2001.

Korean Intellectual Property Office, PCT/US2019/041961, International Search Report and Written Opinion, Oct. 30, 2019. Oct. 30, 2019.

European Patent Office, "Extended European Search Report", EP Appl. No. 19838505.6, Mar. 11, 2022. Mar. 11, 2022.

* cited by examiner

ELECTRO-OPTIC DISPLAYS AND DRIVING METHODS

CROSS-REFERENCE TO RELATED APPLICATIONS

This application is a continuation of U.S. patent application Ser. No. 16/512,726, filed on Jul. 16, 2019, which claims priority to U.S. Provisional Application 62/699,117, filed on Jul. 17, 2018. The entire contents of the aforementioned applications are incorporated herein by reference. Further, the entire contents of any patent, published application, or other published work referenced herein are incorporated by reference in their entireties.

FIELD OF THE INVENTION

The subject matter presented herein is directed to driving methods for electro-optic display devices.

BACKGROUND OF THE INVENTION

In order to achieve a color display, color filters are often used. The most common approach is to add color filters on top of black/white sub-pixels of a pixelated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When a black state is desired, all three-sub-pixels are turned to the black state. When a white state is desired, the three sub-pixels are turned to red, green and blue, respectively, and as a result, a white state is seen by the viewer.

The biggest disadvantage of such a technique is that since each of the sub-pixels has a reflectance of about one third (⅓) of the desired white state, the white state is fairly dim. To compensate this, a fourth sub-pixel may be added which can display only the black and white states, so that the white level is doubled at the expense of the red, green or blue color level (where each sub-pixel is now only one fourth of the area of a pixel). Brighter colors can be achieved by adding light from the white pixel, but this is achieved at the expense of color gamut to cause the colors to be very light and unsaturated. A similar result can be achieved by reducing the color saturation of the three sub-pixels. Even with these approaches, the white level is normally substantially less than half of that of a black and white display, rendering it an unacceptable choice for display devices, such as e-readers or displays that need well readable black-white brightness and contrast.

SUMMARY OF THE INVENTION

The subject matter disclosed herein relates to driving method for driving a display comprising an electrophoretic material having at least one type of colored pigment particle. One such method may include applying at least one pulse pair to reset the at least one type of colored pigment particle, applying a separation pulse, and applying a second pulse pair to reset the at least one type of colored pigment particle.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION OF THE INVENTION

Figure 1:
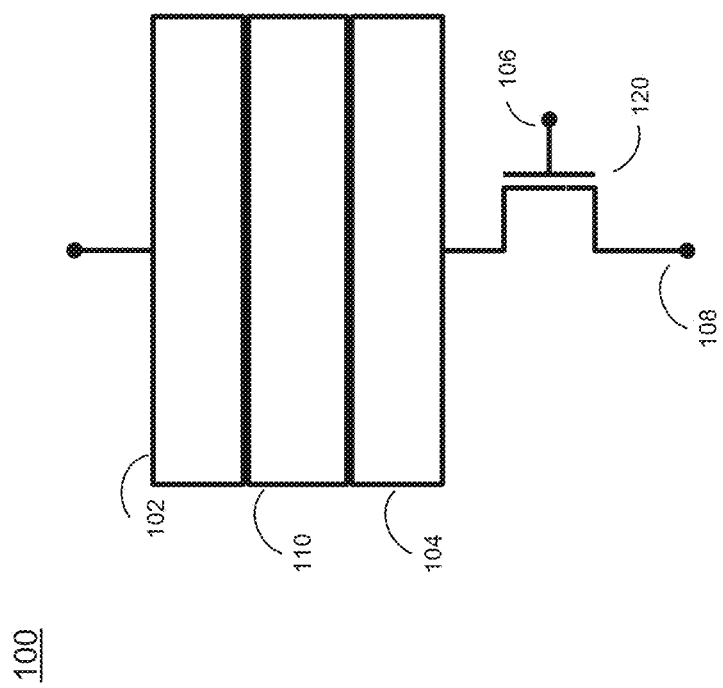
FIG. 1 illustrates a schematic representation of an electro-optic display in accordance with the subject matter presented herein.

The present invention relates to methods for driving electro-optic displays in dark mode, especially bistable electro-optic displays, and to apparatus for use in such methods. More specifically, this invention relates to driving methods which may allow for reduced "ghosting" and edge artifacts, and reduced flashing in such displays when displaying white text on a black background. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to above describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level (or "graytone")

to a final gray level (which may or may not be different from the initial gray level). The terms "gray state," "gray level" and "graytone" are used interchangeably herein and include the extreme optical states as well as the intermediate gray states. The number of possible gray levels in current systems is typically 2-16 due to limitations such as discreteness of driving pulses imposed by the frame rate of the display drivers and temperature sensitivity. For example, in a black and white display having 16 gray levels, usually, gray level 1 is black and gray level 16 is white; however, the black and white gray level designations may be reversed. Herein, graytone 1 will be used to designate black. Graytone 2 will be a lighter shade of black as the graytones progress towards graytone 16 (i.e., white).

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

It should be appreciated that even though the various embodiments presented below use electrophoretic materials with micro-cells to illustrate the working principles in accordance with the subject matter presented herein, the same principles may be easily adopted for electrophoretic materials with micro-capsulized particles (e.g., pigment particles). Electrophoretic material with micro-cells are used herein for illustration and not to serve as a limitation.

FIG. 1 illustrates a schematic model of a display pixel 100 of an electro-optic display in accordance with the subject matter presented herein. Pixel 100 may include an imaging film 110. In some embodiments, imaging film 110 may be a layer of electrophoretic material and bistable in nature. This electrophoretic material may include a plurality of electrically charged colored pigment particles (e.g., black, white, or red) disposed in a fluid and capable of moving through the fluid under the influence of an electric field. In some embodiments, imaging film 110 may be an electrophoretic film having micro-cells with charged pigment particles. In some other embodiments, imaging film 110 may include, without limitation, an encapsulated electrophoretic imaging film, which may include, for example, charged pigment particles. It should be appreciated that the driving method presented below may be easily adopted for either types of electrophoretic material (e.g., encapsulated or film with micro-cells).

In some embodiments, imaging film 110 may be disposed between a front electrode 102 and a rear or pixel electrode 104. Front electrode 102 may be formed between the imaging film and the front of the display. In some embodiments, front electrode 102 may be transparent and light-transmissive. In some embodiments, front electrode 102 may be formed of any suitable transparent material, including, without limitation, indium tin oxide (ITO). Rear electrode 104 may be formed on an opposed side of the imaging film 110 to the front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may be a diode and/or a transistor, including, without limitation, a MOSFET or a Thin-Film Transistor (TFT). The drain (or source) of the MOSFET or TFT may be coupled to back-plate or pixel electrode 104, the source (or drain) of the MOSFET or TFT may be coupled to the addressing electrode 108, and the gate of the MOSFET or TFT may be coupled to a driver electrode 106 configured to control the activation and deactivation of the MOSFET or TFT. (For simplicity, the terminal of the MOSFET or TFT coupled to back-plate electrode 104 will be referred to as the MOSFET or TFT's drain, and the terminal of the MOSFET or TFT coupled to addressing electrode 108 will be referred to as the MOSFET or TFT's source. However, one of ordinary skill in the art will recognize that, in some embodiments, the source and drain of the MOSFET or TFT may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In use, the pixels 100 of the active matrix may be written in a row-by-row manner. For example, a row of pixels may be selected by the row driver, and the voltages corresponding to the desired optical states for the row of pixels may be applied to the pixels by the column drivers. After a preselected interval known as the "line address time," the selected row may be deselected, another row may be selected, and the voltages on the column drivers may be changed so that another line of the display is written.

Figure 2:
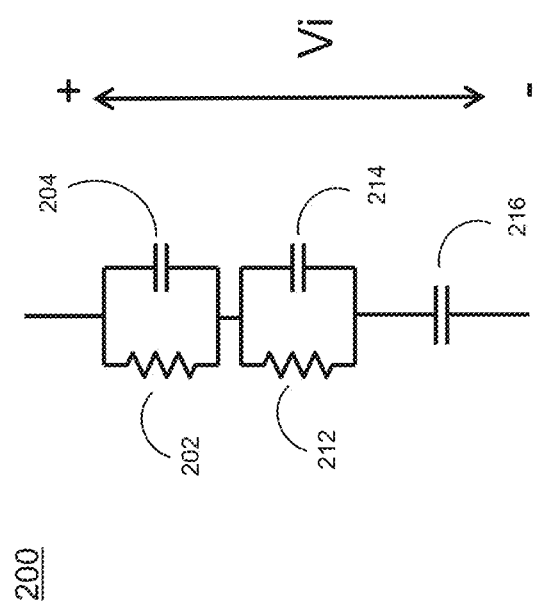
FIG. 2 illustrates an equivalent circuit representing the electro-optic display illustrated in FIG. 1.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3:
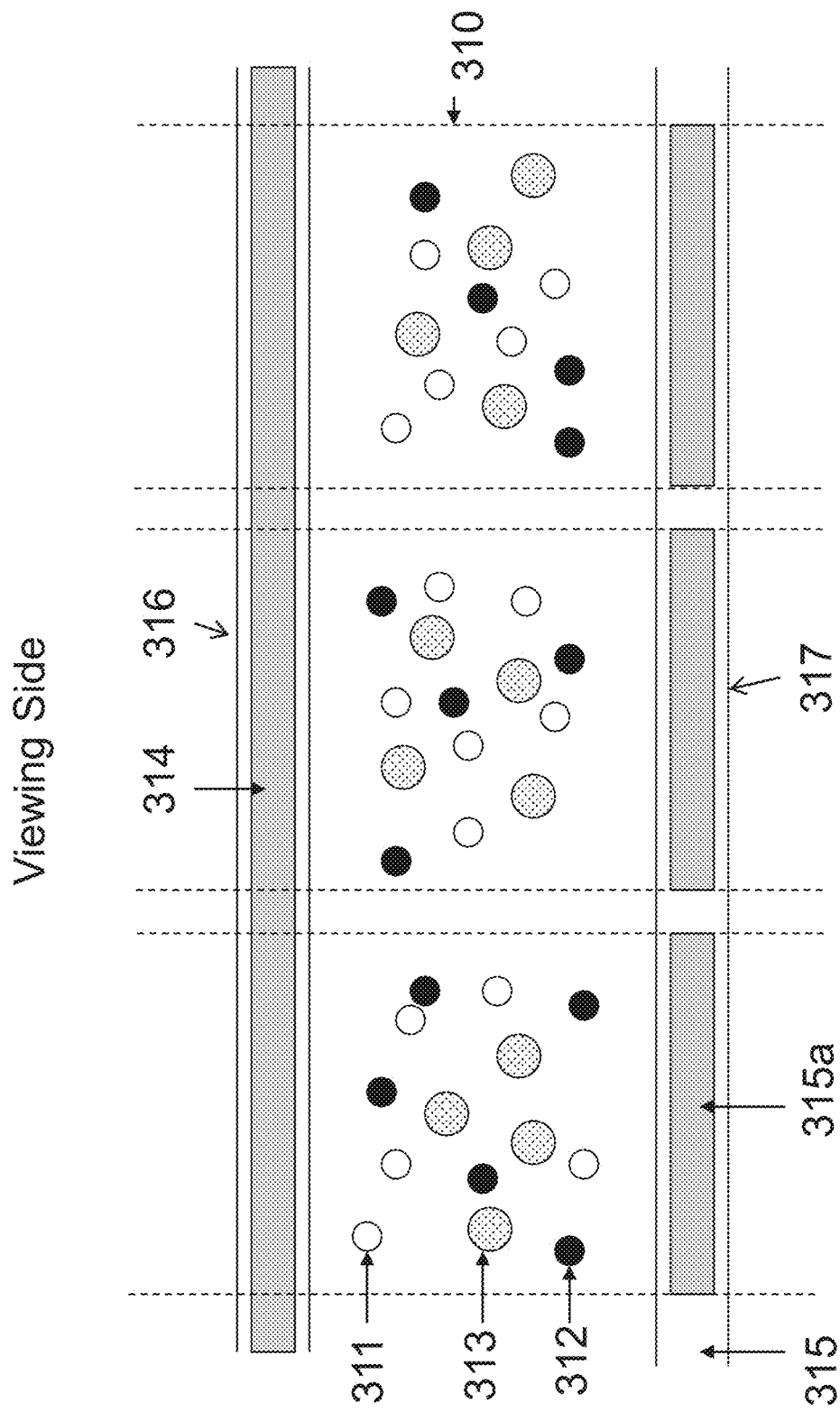
FIG. 3 illustrates cross sectional view of an electro-optic display in accordance with the subject matter presented herein.

A cross sectional view of an exemplary imaging film 310 (e.g., an electrophoretic film) similar to the image layer 110 shown in FIG. 1 is illustrated in FIG. 3. Imaging film 310 may include micro-cells encompassing electrophoretic fluids. It should be appreciated that an electrophoretic material with micro-cells are used herein for illustrating the general working principles of the subject matter presented herein, where the same principles can work for electrophoretic film with capsules. As illustrated, the imaging film 310 may include three types of pigment particles dispersed in a dielectric solvent or solvent mixture. For ease of illustration, the three types of pigment particles may be referred to as white particles 311, black particles 312 and colored particles 313, where the colored particles are non-white and non-black.

However, it should be appreciated that the scope of the subject matter presented herein broadly encompasses pigment particles of any colors as long as the three types of pigment particles have visually distinguishable colors. Therefore, the three types of pigment particles may also be referred to as a first type of pigment particles, a second type of pigment particles and a third type of pigment particles.

It should also be appreciated that even though a three particles system is used herein to illustrate the general principles of the subject matter, the same principles can be easily adopted for systems with different number of particles (e.g., 4 particles, 5 particles, 6 particles, etc.).

For the white particles, they may be formed from an inorganic pigment, such as $TiO_2$, $ZrO_2$, $ZnO$, $Al_2O_3$, $Sb_2O_3$, $BaSO_4$, $PbSO_4$ or the like. For the black particles, they may be formed from CI pigment black 26 or 28 or the like (e.g., manganese ferrite black spinel or copper chromite black spinel) or carbon black.

The third type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Those are commonly used organic pigments described in color index handbook "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

In addition to the colors, the first, second and third types of particles may have other distinct optical characteristics, such as optical transmission, reflectance, luminescence or, in the case of displays intended for machine reading, pseudo-color in the sense of a change in reflectance of electromagnetic wavelengths outside the visible range.

The solvent in which the three types of pigment particles are dispersed may be clear and colorless. It preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul MN, low molecular weight halogen containing polymers such as poly(perfluoropropylene oxide) from TCI America, Portland, Oregon, poly(chlorotrifluoro-ethylene) such as Halocarbon Oils from Halocarbon Product Corp., River Edge, NJ, perfluoropolyalkylether such as Galden from Ausimont or Krytox Oils and Greases K-Fluid Series from DuPont, Delaware, polydimethylsiloxane based silicone oil from Dow-corning (DC-200).

A display layer utilizing the display fluid of the present invention has two surfaces, a first surface 316 on the viewing side and a second surface 317 on the opposite side of the first surface 316. The second surface therefore is on the non-viewing side. The term "viewing side" refers to the side at which images are viewed.

The display fluid is sandwiched between the two surfaces. On the side of the first surface 316, there is a common electrode 314 which is a transparent electrode layer (e.g., ITO), spreading over the entire top of the display layer. On the side of the second surface 317, there is an electrode layer 315 which comprises a plurality of pixel electrodes 315a.

The display fluid is filled in display cells. The display cells may be aligned with or not aligned with the pixel electrodes. The term "display cell" refers a micro-container which is filled with an electrophoretic fluid. Examples of "display cells" may include the cup-like microcells as described in U.S. Pat. No. 6,930,818 and microcapsules as described in U.S. Pat. No. 5,930,026. The micro-containers may be of any shapes or sizes, all of which are within the scope of the present application.

An area corresponding to a pixel electrode may be referred to as a pixel (or a sub-pixel). The driving of an area corresponding to a pixel electrode is effected by applying a voltage potential difference (or known as a driving voltage or an electric field) between the common electrode and the pixel electrode.

The pixel electrodes may be of an active matrix driving system with a thin film transistor (TFT) backplane, or other types of electrode addressing as long as the electrodes serve the desired functions.

The space between two vertical dotted lines denotes a pixel (or a sub-pixel). For brevity, when "pixel" is referred to in a driving method, the term also encompasses "sub-pixels."

In some embodiments, two of the three types of pigment particles can carry opposite charge polarities and the third type of pigment particles may be slightly charged. The term "slightly charged" or "lower charge intensity" is intended to refer to the charge level of the particles being less than about 50%, preferably about 5% to about 30%, the charge level of the stronger charged particles. In one embodiment, the charge intensity may be measured in terms of zeta potential. In one embodiment, the zeta potential is determined by Colloidal Dynamics AcoustoSizer IIM with a CSPU-100 signal processing unit, ESA flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to between 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

For example, if the black particles are positively charged and the white particles are negatively charged, and then the colored pigment particles may be slightly charged. In other words, in this example, the charge levels carried by the black and the white particles are higher than the charge level carried by the colored particles.

In addition, the colored particles which carries a slight charge has a charge polarity which is the same as the charge polarity carried by either one of the other two types of the stronger charged particles.

It is noted that among the three types of pigment particles, the one type of particles which is slightly charged preferably may have a larger size.

In addition, in the context of the subject matter presented herein, a high driving voltage may be defined as a driving voltage which is sufficient to drive a pixel from one extreme color state to another extreme color state. If the first and the second types of pigment particles are the higher charged particles, a high driving voltage then refers a driving voltage which is sufficient to drive a pixel from the color state of the first type of pigment particles to the color state of the second type of pigment particles, or vice versa.

In practice, the white pigment particles 311 may be negatively charged while the black pigment particles 312 are positively charged, and both types of the pigment particles may be smaller than the colored particles 313. The colored particles 313 may carry the same charge polarity as the black particles, but are slightly charged. As a result, the black particles move faster than the colored particles 313 under certain driving voltages.

In practice, several issues may arise that could impact the quality of each of the three color states. One of the issues being a color tinting of the black and white states. For example, if the colored particles were red, the white state may suffer from having a red tint (i.e., a high a* value), which comes from the red particles that did not separate well from the white particles. Although the white and red particles can carry opposite charge polarities, a small amount of the red particles shown on the viewing side at the white state could cause a red tint, which is unpleasant to the viewer. The black state also suffers from the red tint. The black and red particles carry the same charge polarity, but with different levels of charge intensity. The higher charged black particles are expected to move faster than the lower charged red particles to show a good black state, without the red tint; but, in practice, the red tint is hard to avoid.

A second issue that may arise is the ghosting phenomenon, which may be caused by pixels driven from different color states to the same color state and the resulting color state often shows differences in $L^*$ (i.e., $\Delta L^*$) and/or differences in $a^*$ (i.e., $\Delta a^*$), because the previous states are of different colors.

In one example, two groups of pixels may be driven concurrently to a black state. The first group of pixels driven from a white state to the black state may show an $L^*$ of 15, and the other group of pixels driven from a black state to the end black state may show an $L^*$ of 10. In this case, the end black state will have $\Delta L^*$ of 5.

In another example of a three color system, three groups of pixels are driven concurrently to a black state. The first group of pixels driven from red to the black state may show an $L^*$ of 17 and an $a^*$ value of 7 (a high $a^*$ value here, also indicative of color tinting). The second group of pixels driven from a black state to the end black state may show an $L^*$ of 10 and an $a^*$ value of 1. The third group of pixels driven from a white state to the end black state may show an $L^*$ of 15 and an $a^*$ of 3. In this case, the most severe ghosting is resulted from $\Delta L^*$ being 7 and $\Delta a^*$ being 6.

Another issue that may arise is the degradation of colors over time. For example, after 50 image updates or so, display with front plane laminates that have high resistance sealing materials may experience a gradual color degradation. This degradation is not permanent usually but very repeatable nevertheless.

The subject matter presented herein includes driving methods which can provide improvement on all the above mentioned issues. In other words, the driving methods presented herein can reduce/eliminate not only color tinting (i.e., lowering the $a^*$ value of the black and/or white state) but also the ghosting effect (i.e., lowering $\Delta L^*$ and $\Delta a^*$), while improving color purity and reducing color degradation that may occur over time.

Figure 4:
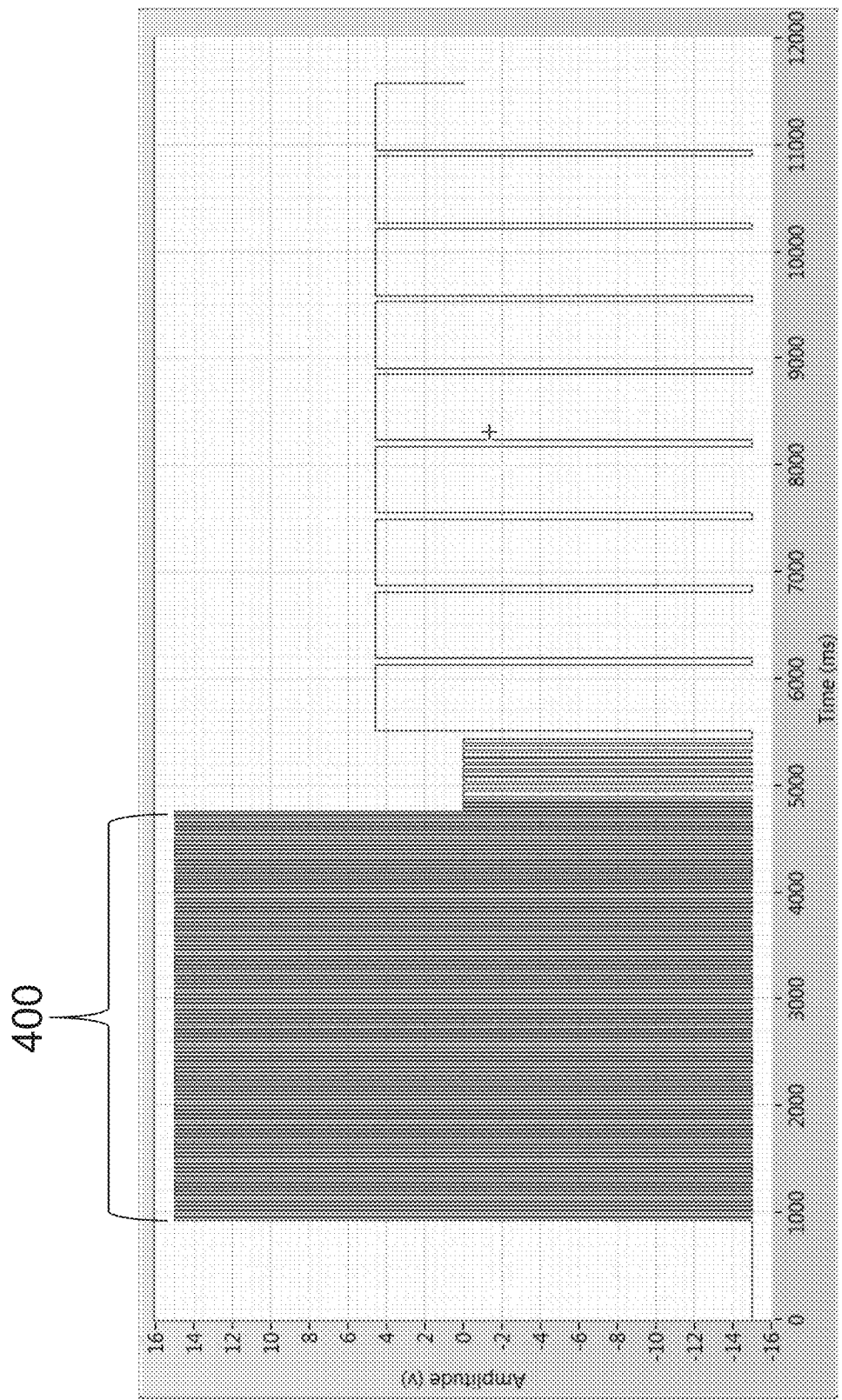
FIG. 4 illustrates one embodiment of a driving method for driving an electro-optic display in accordance with the subject matter presented herein.
Figure 5:
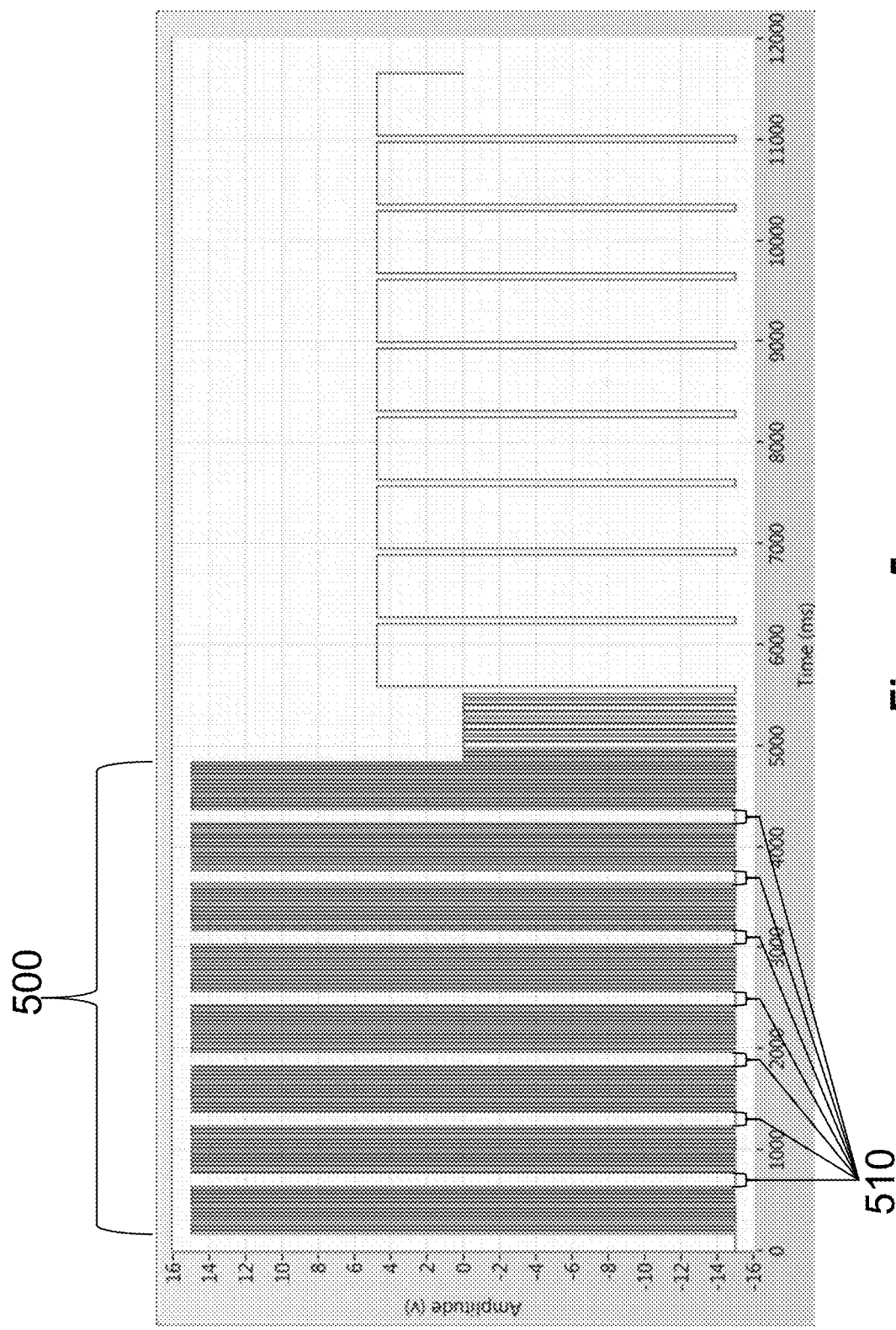
FIG. 5 illustrates another embodiment of a driving method for driving an electro-optic display in accordance with the subject matter presented herein.

In practice, one way to reduce or eliminate the above mentioned unwanted optical defects (e.g., color tints, ghosting and color degradation) is to "re-set" or "pre-condition" the particles prior to driving a pixel to a desired color state. FIGS. 4 and 5 illustrate driving methods that may be used to perform a "re-set" or "pre-condition" that is in accordance with the subject matter disclosed herein.

The notation "msec" as used herein stands for millisecond.

In some embodiments, a reset or pre-conditioning of the particles may include a shaking waveform, where such shaking waveform may include repeating a pair of driving pulses with opposite polarities for many cycles. For example, as illustrated in FIG. 4, a shaking waveform 400 may consist of pulse pairs having a +15V pulse for 20 msec and a −15V pulse for 20 msec, and such pulse pair may be repeated for more than 80 times, where the overall duration of this shaking waveform would be more than 3200 msec.

In some embodiments, each of the driving pulses in the shaking waveform may be applied for not exceeding half of the driving time required for driving a display pixel from a full black state to the a white state, or vice versa. For example, if it took 300 msec to drive a pixel from a full black state to a full white state, or vice versa, the shaking waveform may consist of positive and negative pulses, each applied for not more than 150 msec. In practice, it is usually preferred that these pulses are shorter in duration.

In some other embodiments, it may be preferred that that a shaking waveform include one or more separation pulses. Meaning, instead of applying the +15V/−15V pulse pairs repeatedly and continuously as illustrated in FIG. 4, separation pulses may be introduced to reset or separate the pulse pairs. Where the term "separation pulse" as used herein refers to a pulse with constant voltage amplitude and polarity, different from the pulse pair described above. In another word, constant voltage pulses may be placed between the repeating +15V/−15V pulse pairs, and the duration of the resetting or separation pulses may be longer or shorter than a +15V/−15V pulse pair, depending on the intended display application. For example, a +15V/−15V pulse pair may consist of a +15V pulse for 20 msec and a −15V pulse for 20 msec, for a total of 40 msec in duration. Where a separation pulse may have a duration 2 or 3 times or more of the pulse pair. It is preferred that the duration of the separation pulse to be not long enough to drive the display pixel to an extreme optical state (e.g., full black or full white). In one embodiment shown in FIG. 5, a shaking waveform 500 having a plurality of +15V/−15V pulse pairs may be divided into 8 groups with separation pulses separating the groups. In this embodiment, the shaking pulse pairs consist a +15V pulse and a −15V pulse.

In some other embodiments, a shaking waveform as described above does not have to have the pulse pair groups spaced evenly apart. Meaning, each pulse pair group within a shaking waveform may include different number of the pulse pairs (e.g., the +15V/−15V pulse pair mentioned above). For example, one group may have 20 pulse pairs while another group may have 30 such pulse pairs.

In yet some other embodiments, the separation pulse may have different durations, for the purpose of optimizing display performances. For example, one separation pulse may have a first duration while another separation pulse within the same shaking waveform can have a second duration that is different from the first duration. Furthermore, the separation pulses may have different voltage amplitudes. For example, a first separation pulse may have a first voltage amplitude while a second separation pulse within the same shaking waveform may have a second amplitude different from the first amplitude.

It should be further appreciated that the separation pulse may carry different polarities as illustrated in FIG. 5. FIG. 5 illustrates separation pulses 510 with a negative polarity (e.g., negative 15 volt). It needs to be noted that a separation pulse may very well carry a positive polarity (e.g., positive 15 volt). And it needs to be further noted that separation pulses within a shaking waveform may carry an opposite polarity from another separation pulse. For example, a first separation pulse may be positive 15 volt in amplitude and polarity, while a different separation pulse within the same shaking waveform may be of negative 15 volt in amplitude and polarity. Similarly, a separation pulse may have a different voltage amplitude than another separation pulse. For example, one separation pulse may be positive 10 volts in amplitude, while a second separation pulse may be 15 volts in amplitude.

It should also be noted that the duration or length of the shaking pulse may depend on the physical attributes of the electrophoretic material and/or the display itself. For example, the duration of the shaking pulse may increase or decrease, depending on the resistance of the sealing material used on the display.

It is further noted that in FIGS. 4 and 5, the shaking waveform may be abbreviated (i.e., the number of pulses is fewer than the actual number for some driving methods).

After the "re-set" or "pre-condition" with shaking is completed, the three types of particles should be in a mixed state in the display fluid. Subsequently, a pixel may then be driven to a desired color state (e.g., black, red or white). For example, a positive pulse may be applied to drive the pixel to black; a negative pulse may be applied to drive the pixel to white; or a negative pulse followed by a positive pulse of lower amplitude may be applied to drive the pixel to red.

When comparing driving methods with or without the "re-set" or "pre-condition" of the present invention, the methods with the "re-set" or "pre-condition" of the present invention have the added advantage of shorter waveform time in achieving the same levels of optical performance (including ghosting).

In practice, a shaking waveform as illustrated in FIGS. 4 and 5 may be followed by a period of zero volt driving, prior to the pixel being driven to a desired color state (e.g., red).

It should be noted that the pulse pairs illustrated in FIGS. 4 and 5 are DC balanced, meaning, the positive pulse (e.g., +15 volt pulse) and the negative pulse (e.g., −15 volt pulse) are equal in amplitude, resulting in an overall shaking waveform that is DC balanced. As such, no excess charges are introduced to the display medium (e.g., an electrophoretic medium) or the display itself due to the application of the shaking waveform, which can prevent degradations in display performance. However, in some applications, a DC imbalanced pulse pair may be used to achieve various purposes (e.g., better particle separations). For example, a pulse pair may consist of a positive pulse of +15 volts and a negative pulse of −10 volts. And similar to the subject matter presented in FIGS. 4 and 5, a shaking waveform consisting of such pulse pairs can also include separation pulses. In the case of the pulse pair and shaking waveform are DC imbalanced, a charge discharge process (e.g., remnant voltage discharge process) may be applied at the end of an update. Exemplary methods of discharge remnant voltages and charges are discussed in more details in U.S. patent application Ser. No. 15/266,554, which is incorporated herein in its entirety.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of display pixels, wherein the electro-optic display includes an electrophoretic material having at least one type of colored pigment particle in a fluid disposed between a common electrode and pixel electrodes associated with each display pixel, the method comprising:
   applying at least one first pulse pair to the plurality of display pixels to reset the at least one type of colored pigment particle;
   applying a separation pulse having a constant voltage amplitude to the plurality of display pixels to drive the plurality of display pixels toward an extreme optical state, wherein a duration of the separation pulse is not long enough to drive the plurality of display pixels to the extreme optical state; and
   applying at least one second pulse pair to the plurality of display pixels to reset the at least one type of colored pigment particle, and thereby produce the at least one type of colored pigment particle in a mixed state in the fluid, wherein the at least one second pulse pair includes a pulse having a positive amplitude and a pulse having a negative amplitude,
   wherein the pulse having the positive amplitude and the pulse having the negative amplitude have the same duration,
   wherein the at least one second pulse pair is DC balanced, and wherein the separation pulse is the only pulse between the at least one first pulse pair and the at least one second pulse pair,
   wherein the separation pulse has a constant negative polarity for the duration of the separation pulse.

2. The method of claim 1 wherein the at least one first pulse pair includes a pulse having a positive amplitude and a pulse having a negative amplitude.

3. The method of claim 2 wherein the pulse having the positive amplitude and the pulse having the negative amplitude have the same duration.

4. The method of claim 1 wherein the at least one first pulse pair is DC balanced.

5. The method of claim 1 wherein the driving method is DC balanced.

6. The method of claim 2 wherein the separation pulse has the same amplitude as the pulse having the negative amplitude.

7. The method of claim 1 wherein the extreme optical state comprises one of a full black state or a full white state on the display.

8. The method of claim 1 wherein the electrophoretic material has at least three types of colored pigment particles disposed in the fluid.

9. The method of claim 1 wherein none of the pulses applied to the plurality of display pixels has a duration long enough to drive the plurality of display pixels to the extreme optical state.

10. A method for driving an electro-optic display having a plurality of display pixels, wherein the electro-optic display includes an electrophoretic material having at least one type of colored pigment particle in a fluid disposed between a common electrode and pixel electrodes associated with each display pixel, the method comprising:
    applying at least one first pulse pair to the plurality of display pixels to reset the at least one type of colored pigment particle;
    applying a separation pulse to the plurality of display pixels, wherein the separation pulse applied to each of the plurality of display pixels has the same amplitude and polarity, and wherein a duration of the separation pulse is not long enough to drive the plurality of display pixels to an extreme optical state; and
    applying at least one second pulse pair to the plurality of display pixels to reset the at least one type of colored pigment particle, and thereby produce the at least one type of colored pigment particle in a mixed state in the fluid,
    wherein the at least one second pulse pair includes a pulse having a positive amplitude and a pulse having a negative amplitude, wherein the pulse having the positive amplitude and the pulse having the negative amplitude have the same duration,
    wherein the at least one second pulse pair is DC balanced, and wherein the separation pulse is the only pulse between the at least one first pulse pair and the at least one second pulse pair,
    wherein the separation pulse maintains a constant amplitude and a constant negative polarity for the duration of the separation pulse.

11. The method of claim 10 wherein the at least one first pulse pair includes a pulse having a positive amplitude and a pulse having a negative amplitude.

12. The method of claim 11 wherein the pulse having the positive amplitude and the pulse having the negative amplitude have the same duration.

13. The method of claim 10 wherein the at least one first pulse pair is DC balanced.

14. The method of claim 10 wherein the driving method is DC balanced.

15. The method of claim 11 wherein the separation pulse has the same amplitude as the pulse having the negative amplitude.

16. The method of claim 10 wherein the extreme optical state comprises one of a full black state or a full white state on the display.

17. The method of claim 10 wherein the electrophoretic material has at least three types of colored pigment particles disposed in the fluid.

18. The method of claim 10 wherein none of the pulses applied to the plurality of display pixels has a duration long enough to drive the plurality of display pixels to the extreme optical state.

* * * * *